(12) United States Patent
Mehr

(10) Patent No.: US 7,330,982 B1
(45) Date of Patent: Feb. 12, 2008

(54) SECURED AUTOMATED PROCESS FOR SIGNED, ENCRYPTED OR VALIDATED CONTENT GENERATION

(75) Inventor: Assaph Mehr, St. Leonards (AU)

(73) Assignee: Avaya Technology Corp., Basking Ridge, NJ (US)

( * ) Notice: Subject to any disclaimer, the term of this patent is extended or adjusted under 35 U.S.C. 154(b) by 670 days.

(21) Appl. No.: 10/867,856

(22) Filed: Jun. 14, 2004

(51) Int. Cl.
*G06F 21/00* (2006.01)
(52) U.S. Cl. .......................... 713/194; 705/57
(58) Field of Classification Search ............... 713/194
See application file for complete search history.

(56) References Cited

U.S. PATENT DOCUMENTS

| 7,181,603 | B2 * | 2/2007 | Rothrock et al. ............... 713/1 |
| 2003/0154391 | A1 * | 8/2003 | Ayars et al. .................. 713/194 |
| 2004/0255114 | A1 * | 12/2004 | Lee et al. ..................... 713/156 |

OTHER PUBLICATIONS 4.14) "How can I use GnuPG in an automated environment," http://www.gnupg.org/(en)/documentation/faqs.html, 1 page, printed May 17, 2004.
Alsaid and Mitchell, "Digitally Signed Documents—Ambiguities and Solutions," Information Security Group, Royal Holloway, University of London, Egham, Surrey, UK, 8 pages, date unknown.

* cited by examiner

*Primary Examiner*—Kambiz Zand
*Assistant Examiner*—Andrew L Nalven
(74) *Attorney, Agent, or Firm*—Sheridan Ross P.C.

(57) ABSTRACT

The present invention is directed to providing a secure signed, encrypted or validated content generation system. In particular, embodiments of the present invention allow the integrity of a content generation process to be verified by comparing a viewpoint of that process, as it exists in memory at the time content to be signed is generated, to a viewpoint of that process in memory obtained under controlled conditions. If verification is successful, the generated content is signed using a private key maintained as part of a keystore module.

49 Claims, 4 Drawing Sheets

(Priot Art)

SECURED AUTOMATED PROCESS FOR SIGNED, ENCRYPTED OR VALIDATED CONTENT GENERATION

FIELD OF THE INVENTION

The present invention is related to digitally signing and encrypting content. In particular, the present invention provides a tamper resistant mechanism for dynamically generating signed and/or encrypted electronic content.

BACKGROUND OF THE INVENTION

Automated processes for providing signed, encrypted or validated documents or other content have been developed. Signed or validated content can comprise or be used in connection with license key files that are automatically generated by a trusted process, without human intervention. Systems for automatically generating signed content are often accessible from public networks. Because of this, the security and integrity of such processes is a concern.

Previous processes for generating signed or validated content have the signing or encrypting key and algorithm embedded in the generating process itself, or the generating process may make a call to an encryption or signing program. Such solutions require one of the following: (1) the private key is known to the generating process; (2) the passphrase protecting the private key is known by and embedded in the generating process; or (3) there is no passphrase protecting the private key. As a result, attacking or otherwise tampering with the signing or encrypting process can be easily achieved.

As an example, conventional processes for automatically generating and delivering access to content for limited times generally include a content (in this case a license file) generation module and an encryption or signing module. According to conventional systems, the content generation module must pass the passphrase of the private key used to sign or encrypt the content to the encryption or signing module as clear text. Alternatively, the private key is unprotected. As a result, an attacker can attack the content generation module, which is traditionally less secure than the signing module, to gain access to the private key. Accordingly, such conventional processes are vulnerable to attack.

SUMMARY OF THE INVENTION

The present invention is directed to solving these and other problems and disadvantages of the prior art. According to embodiments of the present invention, a secured automated process for signed content or document generation is provided. In particular, the private key used to sign, encrypt or validate content is protected against detection, because it is not exposed outside of the signing module. More particularly, the content generation module is not required to store a passphrase protecting the private key or the private key itself. Instead, the content generation module or process itself is characterized and used to determine whether that process has been tampered with when a request for signed content is received. As used herein, signed should be understood to also refer to encrypted and/or validated, unless the usage of the term is expressly limited. If the content generation process is validated by the signing or encrypting module, then the private key, held by the signing or encryption module, is applied to the content. Alternatively, if at the time the request for signed content is received the content generation process is found to not match the characterization of that process, the request will be denied. Additionally the keystore may alert the system administrator and/or stop the content generation module and/or take the system offline.

In accordance with embodiments of the present invention, the portions of the content generation process that are static and dynamic are identified, and a view or memory footprint of such portions is stored in memory, such that the memory footprint is available to the signing or encrypting module. As used herein, memory footprint refers to a view of the content generation process as such process exists in memory at a moment in time. When a request for signed content is received at the content generation process, the requested content is generated and passed to the signing or encrypting module, together with the memory footprint of the content generation process, as that process existed in memory at or about the time that the requested content was generated. The signing or encrypting process then compares the view or memory footprint of the characteristic content generation process that was previously stored to the view or memory footprint of the content generation process at or about the time the requested content was generated. As used herein, "signing" may include "encrypting" or "validating". If the comparison indicates that the static portions of the content generation process have not been altered or that the dynamic portions are in a legal state, the signing or encrypting module considers the request for signed content to be valid. Accordingly, the signing or encrypting module can proceed with the signing or encryption of the generated content. If the characteristic footprint of the content generation process does not match the view or memory footprint provided with the content to be signed, the request is denied.

Additional features and advantages of embodiments of the present invention will become more readily important from the following description, particularly when taken together with the accompanying drawings.

DETAILED DESCRIPTION

Figure 1:
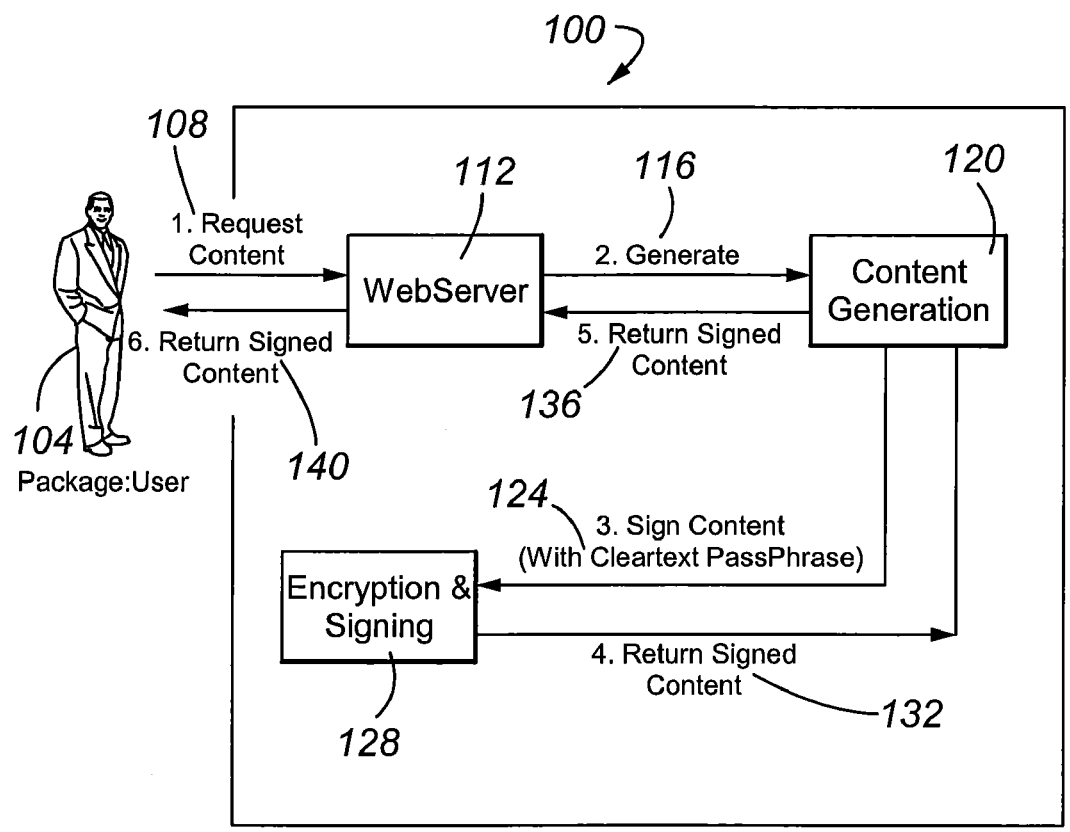
FIG. 1 is a block diagram depicting a signed content generation system in accordance with the prior art.

With reference now to FIG. 1, a signed content generation system 100 in accordance with the prior art is depicted. In general, a user 104 makes a request for content by sending a request content message 108 that is passed to a web server 112. After providing any required identification, information, and/or payment, the web server 112 sends a generate content message 116 to a content generation module 120. The content generation module 120, in response to the request, generates the requested content. The requested content, together with a clear text passphrase, is then passed to a signing or encryption module 128 as part of a sign content message 124 for encryption and/or signing. Provided the passphrase received from the content generation module 120 is valid, the signing or encryption module 128 signs the received content, and sends a return signed content message 132 including the now signed content to the content generation module 120. In particular, the signing or encryption module 128 applies the private key required to sign the content to the received content in response to receipt of a valid passphrase. The content generation module then sends the signed content to the web server 112 as part of a return signed content message 136. The web server 112 in turn sends a return signed content message 140 to the user 104 to deliver the signed content.

Accordingly, a prior art system 100 requires that the signing or encryption module 128 receive a valid passphrase from the content generation module 120, before it will sign received content. Accordingly such a system 100 is vulnerable to attack. For instance, the content generation module 120 has as a primary purpose the generation of requested content. Accordingly, it may not provide robust security for the passphrase that it must store in order to obtain properly signed content from the encryption module 128. In addition, because the prior art system 100 requires that a passphrase be passed from the content generation module 120 to the encryption module 128, it is vulnerable to interception during such a communication. Even worse are the situations where the content generation module 120 has the private key in memory or where the private key is not protected by a passphrase.

Figure 2:
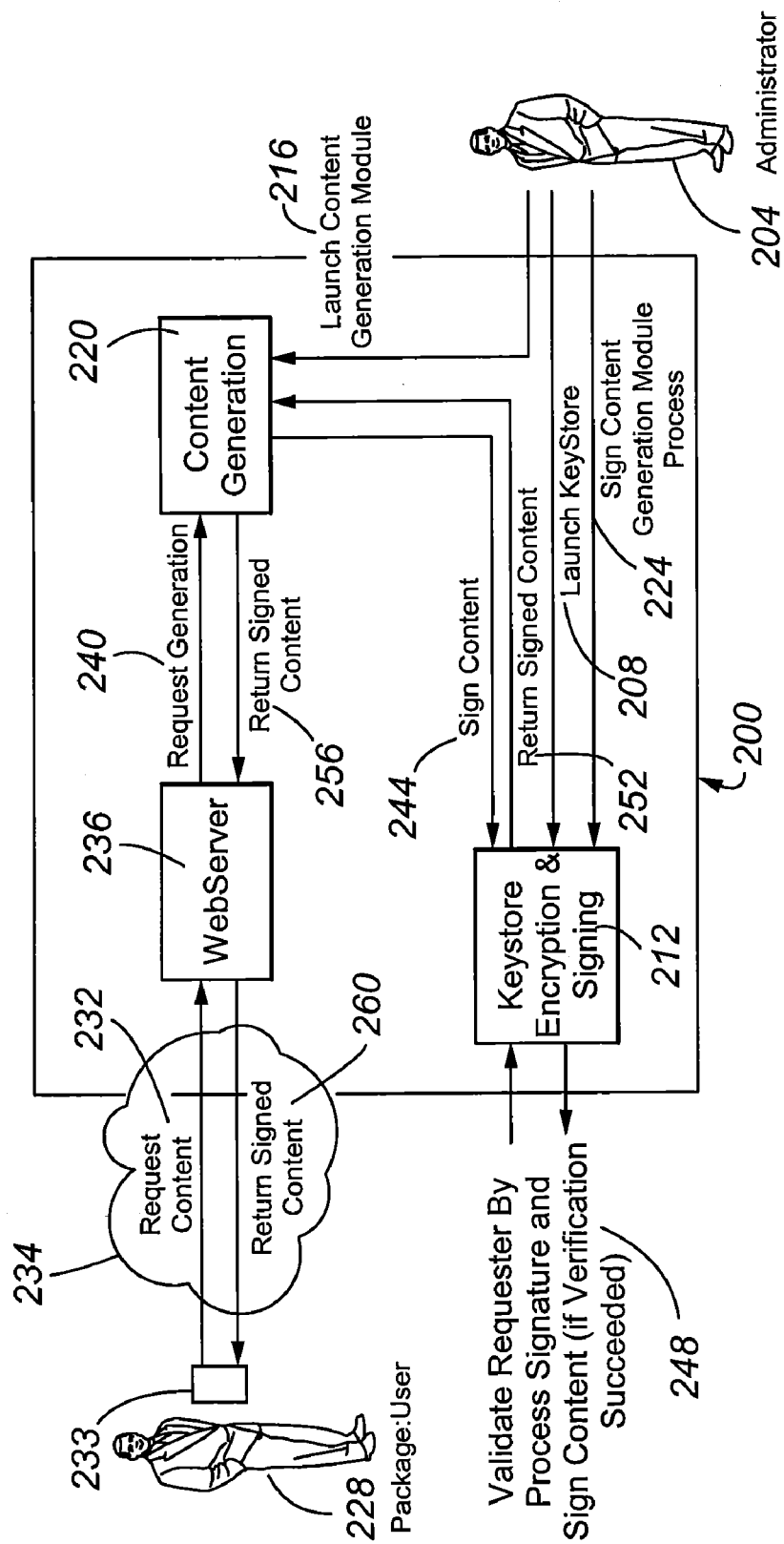
FIG. 2 is a block diagram depicting a signed content generation system in accordance with embodiments of the present invention.

As can be appreciated by one of skill in the art, the messages described herein are an abstraction of the protocols used to communicate between the entities of the system and are not tied to any specific implementation. With reference now to FIG. 2, a signed content generation system 200 in accordance with embodiments of the present invention is illustrated. In general, the content generation system 200 may include a signing or encryption module (also referred to herein as the keystore module) 212, a content generation module 220, and an interface module, such as a web server or other interface 236. The signing or encryption module 212 implements a signing or encryption process for validating requests for signed content and creating signed content in response to validated requests, as will be described in greater detail elsewhere herein. As used herein, the term "signing" includes "encrypting" or "validating" unless expressly limited. As will also be described in greater detail elsewhere herein, the content generation module 220 implements a content generation process for generating unsigned content in response to requests received from, for example, the web server 236.

An administrator 204 may initiate the signing or encryption (i.e. the keystore) process by sending a launch keystore command or message 208 to the signing or encryption module 212. As part of launching the keystore process, the administrator 204 provides the signing or encryption module 212 with a private key. The private key will be used to sign, encrypt and/or validate content (hereinafter referred to as "sign content") in connection with an authorized request for signed, encrypted or validated content (hereinafter referred to as "signed content"). The administrator 204 also sends a launch content generation module command or message 216 to the content generation module 220. After launching the signing or encryption module 212 and launching the content generation module 220, the administrator 204 can issue a sign content generation module process command 224.

As will be described in greater detail elsewhere herein, signing the content generation module process includes taking a view or image of the content generation process 220, as it exists in memory. In particular, the static and dynamic portions of the content generation process 220 in memory can be stored, for example in memory that is part of or available to the signing or encryption module 212. This memory footprint can be obtained before the content generation module 220 is interconnected or otherwise available to requests for content. For example, the view or memory footprint of the content generation process of the content generation module 220 can be obtained before access to the content generation module 220 is available from a public network. More particularly, the provision of a private key to the signing or encryption module 212, and the initiation and characterization of the content generation module 220 can be performed before the system 200 is available to receive requests, and/or before the content generation module 220 is available to requests from a public network.

After the initialization of the content generation system 200 has been performed, a user 228 can send a request content message 232. The request content message 232 may be sent from a user computer or device 233 using a communication channel established over a communication network 234, such as the Internet. The request content message 232 is received at the web server 236, which passes a content generation request message 240 to the content generation module 220. In general, the web server 236 may handle obtaining any required identification, other information and/or or payment from the user 228 that is required in return for the delivery of content.

Upon receiving the request for content, the content generation module 220 generates and passes the requested content to the signing or encryption module 212 as part of a sign content message 244. In addition to the unsigned content, the sign content message 244 from the content generation module 220 provides a view of the content generation process running on or comprising the content generation module as such process existed in memory at or about the time the unsigned content was generated. The signing or encryption module 212 applies the private key that was previously made available to or loaded in the signing or encryption module 212 by the administrator 204 only if the request for signed content passed to it by the content generation module 220 is verified. Verification comprises comparing the view of the content generation process previously recorded with the view of the content generation process received from the content generation module 220 with the unsigned content. More particularly, the static portions of the previously stored process are compared to the static portions of the process provided with the unsigned content and the dynamic portions of the previously stored process are compared to the dynamic portions of the process provided with the unsigned content. If the static portions match and the dynamic portions have changed to a legal state, then the request is verified. Specifically, if the previous view of the content generation process matches the view of the content generation process passed with the content to be signed or it is in a legal state, the signing or encryption module 212 can verify that the content generation process running on the content generation module 220 has not been altered (i.e., hacked). That is, the signing or encryption module 212 validates the requestor, and signs 248 the unsigned content using the private key if verification has succeeded.

The signing or encryption module 212 can then send a return signed content message 252 to the content generation module 220. The content generation module 220 in turn sends a return signed content message 256 that delivers the signed content to the web server 236. The web server 236 may then deliver the signed content to the device 233 through which the user 228 initiated the request, or to some other device, as part of a return signed content message 260. In accordance with embodiments of the present invention, the signed content may comprise a software enabling key or license file.

Figure 3:
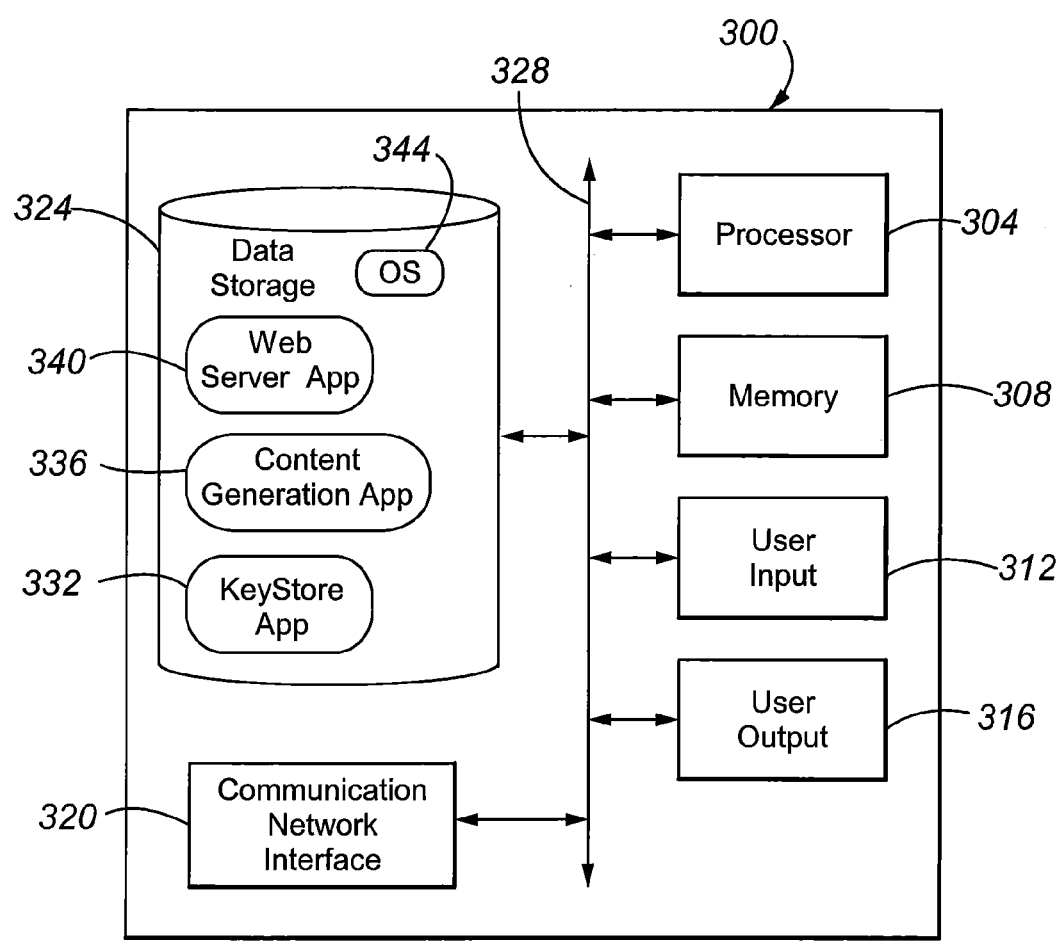
FIG. 3 is a block diagram depicting a signed content generation server in accordance with embodiments of the present invention.

With reference now to FIG. 3, a server 300 in accordance with embodiments of the present invention is depicted. In general, the server 300 may implement all or some of the signing or encryption module 212, content generation module 220, and/or the web server 236 processes or functions. That is, at least some of the modules, such as the signing or encryption module 212, the content generation module 220, and the web server 236, may be implemented in connection with one or more servers 300. A server 300 may include a processor 304, memory 308, an input device or devices 312, an output device or devices 316, a communication network interface or interfaces 320, and data storage 324. A communication bus 328 may also be provided to enable communications between the various components.

The processor 304 may include any general purpose programmable processor or controller 304 for executing application programming or instructions. Alternatively, the processor 304 may comprise a specially configured application specific integrated circuit (ASIC). The processor 304 generally functions to run programming code implementing various of the functions performed by the server 300, including the web server, content generation, and/or signing functions or operations described herein. The memory 308 may be provided for use in connection with the execution of the programming, and for the temporary or long term storage of data or program instructions. The memory 308 may comprise solid state memory, such as DRAM and SDRAM. Where the processor 304 comprises a controller, the memory 308 may be integral to the processor 304.

A server 300 may additionally include one or more input devices 312 and one or more output devices 316. Such input 312 and output 316 devices may be accessible to an administrator 204. As can be appreciated by one of skill in the art, examples of input devices 312 that may be provided as part of a server 300 include a keyboard and a pointing device. As can also be appreciated by one of skill in the art, examples of output devices 316 include a visual display.

A communication network interface 320 may also be provided for interconnecting a server 300 to a communication network 234, for example in connection with implementing web server 236 functions. In addition, a communication network interface 320 may allow a number of servers 300 to be interconnected to one another, for example over a private network, such as where one or more of the signing 212, content generation 220, and/or web server 236 functions are distributed among different servers 300. A communication network interface 320 is generally determined by the particular type of communication network or networks to which the server 300 is interconnected. For example, the communication network interface 320 may comprise an Ethernet interface where the server 300 is interconnected to an Internet protocol network. Furthermore, it should be appreciated that where a server 300 is interconnected to different types of communication networks, a number of communication network interfaces 320 may be provided.

The data storage 324 may store any number of applications, including a keystore or signing application 332, a content generation application 336, and/or a web server application 340. In addition, operating system programming 344 may be stored in data storage 324, as well as any other applications or data that is stored as part of the operation of a server 300. The data storage 324 may include magnetic storage devices, solid state storage device, optical storage devices, logic circuits, or any combination of such devices. It should further be appreciated that the programs and data that may be maintained in the data storage 324 can comprise software, firmware or hardwired logic, depending on the characteristics of the data storage 324.

Figure 4:
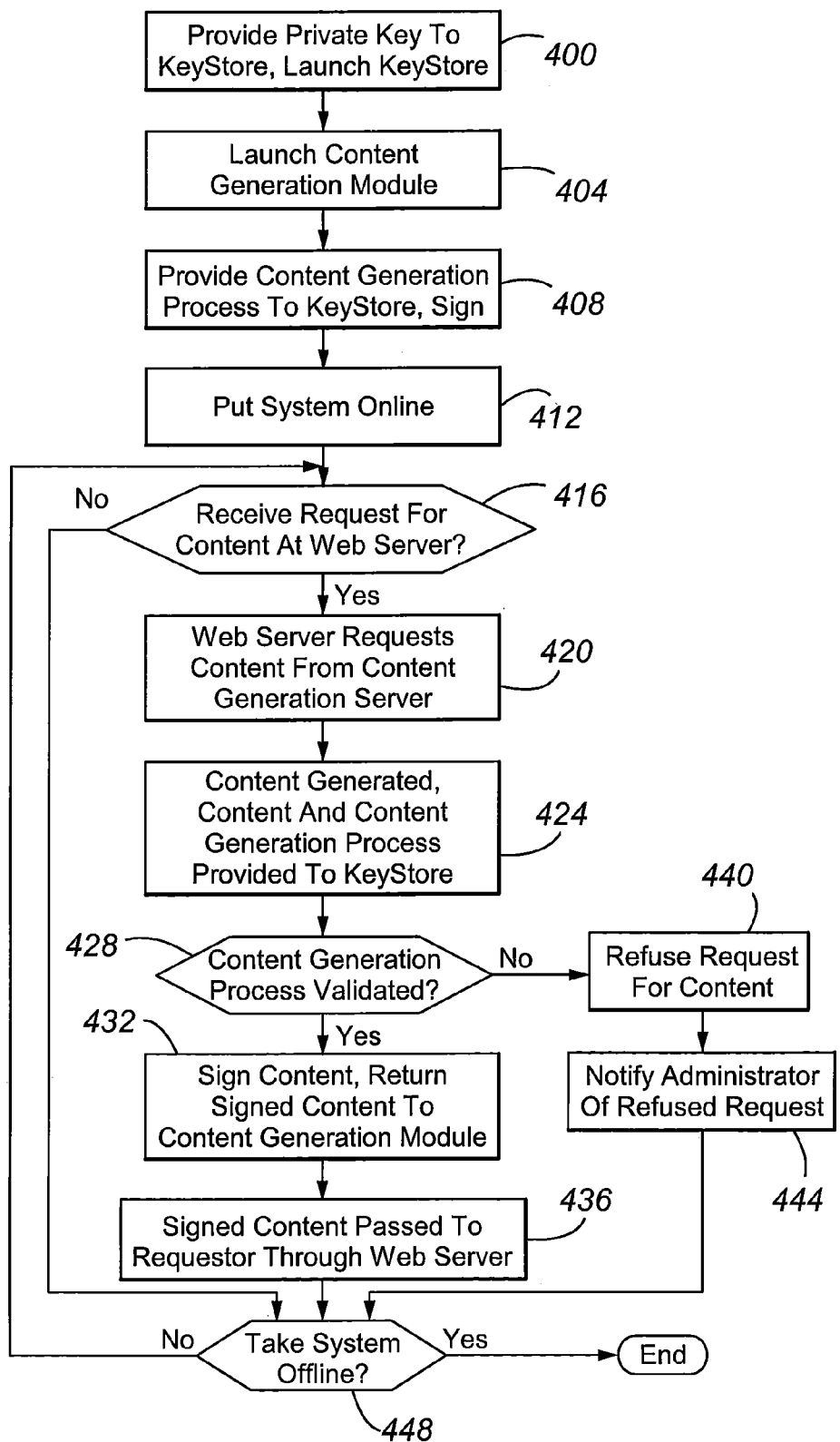
FIG. 4 is a flowchart depicting aspects of the operation of a signed content generation system in accordance with embodiments of the present invention.

With reference now to FIG. 4, aspects of the operation of a signed content generation system 200 in accordance with embodiments of the present invention are illustrated. At step 400, a private key is provided to the signing or encryption module 212, and the signing or encryption module 212 is launched. The private key may be provided to the signing or encryption module 212 by an administrator 204. Furthermore, the private key may be loaded into the signing or encryption module 212 while the module is disconnected from any public communication network, such as the network 234 used by users 228 to make requests for content. As can be appreciated by one of skill in the art from the description provided herein, the private key is used by the signing or encryption process 212 to sign, encrypt and/or validate content generated by the content generation module 220.

The content generation module 220 is launched at step 404. The content generation module 220 generally functions to generate content in response to requests. However, in accordance with embodiments of the present invention, the content generation module 220 is incapable of signing generated content. As can be appreciated by one of skill in the art, steps 400 and 404 can be performed in any sequence or simultaneously.

The content generation process is then provided to the signing or encryption module 212 (step 408). In particular, a first view or memory footprint of at least the static and dynamic portions of the content generation process are provided to the signing or encryption module 212. In addition, the view of the content generation process may be signed by applying the private key that will also be used to sign generated content, or by applying a different private key, to the memory footprint of the content generation process, creating a hash value of the view that was obtained of the content generation process. The first view of the content generation process, or the hash value of that process, is then stored or maintained such that it is accessible to the signing or encryption module 212.

Steps 400 through 408 generally describe those steps that are taken in order to initialize a signed content generation system 200 in accordance with embodiments of the present invention. In order to increase the resistance of the signed content generation system 200 to tampering, steps 400 through 408 may be performed while the system 200 is off line (i.e., is not connected to a public network, such as a communication network 234). Accordingly, following initialization of the signed content generation system 200, the system 200 is placed online (step 412). By placing the system 200 online, it can receive requests for a signed content from users 228. At step 416, a determination is made as to whether a request for content has been received at the web server 236. A request for content may be received as a request content message 232 sent to the web server 236 by a user 228 across a public network 234. If a request has been received, the web server 236 in turn makes a request for content from the content generation module 220 (step 420). The request for content may be made by sending a request generation message 240 to the content generation module 220.

In response to the request received from the web server 236, the content generation module 220 generates or creates the requested content, and passes that content together with a second view or footprint in memory of the content generation process to the signing or encryption module 212 (step 424). The generated content and the second view of the content generation process may be provided as part of a sign content message 244. The signing or encryption module 212 then attempts to validate the content generation process (step 428). In order to perform validation of the content generation process, the footprint or view of the content generation process received with the content to be signed as part of a sign content message 244 is compared to the first view or footprint of the content generation process previously provided to the signing or encryption process 212 as part of the initialization of the system 200 at step 408. In particular, if the second view of the content generation process taken at or about the time the requested content was generated matches the first view of the content generation process saved during initialization of the system 200, the integrity of the content generation process when the content to be signed was generated is verified. As can be appreciated by one of skill in the art, where a hash value of the original or first view taken during initialization is used, a hash value of the second view of the content generation process received with the sign content message 244 is created by applying the same key used to create the hash value of the original or first view. The hash values may then be compared to determine whether the content generation process has been tampered with. As can be appreciated by one of skill in the art from the description provided herein, the portions of the content generation process in memory that are used to determine whether that process has been tampered with may consist of the static and dynamic portions of the content generation process. The static portions may be directly compared to one another, for example where validation requires an exact match between the static portions of the viewpoints of the content generation process or between the hash values created from the static portions of those viewpoints. Additionally, dynamic portions may be considered, and the second view of the content generation process received with the sign content message 244 may be validated if, for example, static portions of the different views match, and nonstatic or dynamic portions fall within an acceptable range. For instance, dynamic portions consisting of a data value may differ between the first view obtained during initialization, and the second view provided with the sign content message 244. Dynamic portions, for example, are the program instruction counter, memory stack structure, allocations table, etc.

If the content generation process used to create the content is validated successfully, the signing or encryption module 212 signs the content, and returns the signed or encrypted content to the content generation module (step 432). In accordance with embodiments of the present invention, the content is signed by applying the private key previously loaded into or made available to the keystore module 212 to the content to create a hash value. The content generation module 220 then passes the signed content to the requesting user 228 through the web server 236 (step 436).

If the content generation process is not successfully validated, the request for a signed content is refused by the signing or encryption module 212 (step 440). In addition, following a refusal to sign content, an administrator 204 may be notified of the refused request, the refusal may be logged (step 444), the content generation module process may be killed, and/or the whole system may be taken offline.

At step 448, a determination is made as to whether the system should be taken or has been taken offline. If the system 200 has not been taken offline, the process may return to step 416. If the system has been taken offline, the process ends.

As described herein, a signed content generation system 200 provides increased security against tampering a process used to create authenticated content. In particular, a signed content generation system 200 in accordance with embodiments of the present invention allows the content generation process itself to be validated. Accordingly, any alteration of the content generation process can be detected. In addition, this arrangement removes the need in the prior art to maintain a key or passphrase within the content generation module in order to serve the key used to sign content.

Embodiments of the present invention may be applied in connection with any situation in which signed or verified content is to be provided as part of an automated system. Accordingly, applications include the provision of license agreements or license files that must be properly signed in order for a licensee to access licensed content, such as application programming or data. Therefore, embodiments of the present invention may be used in connection with providing software enabling keys. However, the present invention is not so limited. In particular, a signed content generation system 200 in accordance with embodiments of the present invention may be used in any circumstance where automated content is provided and signed.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A computational component for performing a method, the method comprising:

initiating a content generation process;

providing a first view of said content generation process to a signing or encryption module;

receiving at said content generation process a request for signed first content;

providing a second view of said content generation process and first content to said signing or encryption module;

comparing said first view of said content generation process to said second view of said content generation process;

in response to said first view of said content generation process matching said second view of said content generation process:

at least one of signing and encrypting said first content by applying a private key known to said signing or encryption module; and passing said signed or encrypted first content to said content generation process.

2. The method of claim 1, further comprising:
providing a private key to said signing or encryption module prior to providing said first view of said contact generation process to said signing or encryption module.

3. The method of claim 1, further comprising:
signing said first view of said content generation process to obtain a first content generation process signature; and
signing said second view of said content generation process to obtain a second content generation process signature, wherein said comparing in said first view of said content generation process to said second view of said content generation process comprises comparing said first content generation process signature to said second content generation process signature.

4. The method of claim 3, wherein said signing said first view of said content generation process to obtain a first content generation process signature comprises applying a first private key to said first view of said content generation process to obtain a signature comprising a first hash value, wherein said signing said second view of said content generation process to obtain a second content generation process signature comprises applying said first private key to said second view of said content generation process to obtain a signature comprising a second hash value, and wherein said comparing said first view of said content generation process to said second view of said content generation process comprises determining whether said first hash value is equal to said second hash value.

5. The method of claim 3, further comprising:
storing said first content generation process signature.

6. The method of claim 1, wherein said providing a first view comprises identifying a code section of said content generation process that does not change over time.

7. The method of claim 6, wherein said providing a second view comprises identifying a code section of said second content generation process that does not change over time.

8. The method of claim 1, wherein said first view of said content generation process is taken from memory.

9. The method of claim 1, wherein said signing said first view of said content generation process includes identifying static portions of said view of said content generation process, and signing said static portions.

10. The method of claim 1, wherein said signing said first view of said content generation process includes:
identifying static and dynamic portions of said view of said content generation process;
signing said static portions; and
analyzing dynamic portions for legal states.

11. The method of claim 1, wherein said providing a first view includes:
freezing said content generation process;
copying said content generation process from memory; and
delivering said copy of said content generation process to said signing or encryption module.

12. The method of claim 1, further comprising:
prior to said receiving at said content generation module a request for signed first content, receiving at an interface module a request for said signed first content; and
passing said signed first content to said interface module.

13. The method of claim 12, wherein said interface module comprises a web server.

14. The method of claim 12, wherein said request for signed first content received at said interface module is received from a requesting device, said method further comprising:
passing said signed first content to said requesting device.

15. The method of claim 14, wherein said requesting device is interconnected to said web server by a public communication network.

16. The method of claim 1, wherein said content generation process is selectively interconnected to a first communication network, and wherein said initiating a content generation process, providing a first view of said content generation process to a signing or encryption module, and signing or encrypting said first view of said content generation process to obtain a first content generation process signature are performed while said content generation process is disconnected from said first communication network.

17. The method of claim 16, wherein said first communication network comprises a public communication network.

18. The method of claim 1, wherein said delivering first content to said signing or encryption module does not include delivering a passphrase or a key with said first content.

19. The method of claim 1, wherein said validating comprises confirming that said content has not been altered.

20. The method of claim 1, wherein said at least one of signing and encrypting comprises signing said first content, and wherein signal first content comprising an authentication certificate is passed to said content generation process.

21. The method of claim 1, wherein said at least one of signing and encrypting comprises encrypting said first content, and wherein encrypted first content is passed to said content generation process.

22. The method of claim 1, wherein said computational component comprises a computer readable storage medium containing instructions for performing the method.

23. The method of claim 1, wherein said computational component comprises a logic circuit.

24. A method for generating signed content, comprising:
providing a first private key to a first module;
obtaining from a memory a first view of a running content generation process, wherein said content generation process is running in a second module;
creating a first representation of said first view;
receiving at said second module a request for signed content;
generating in said second module said requested content using said content generation process;
obtaining from said memory a second view of said running content generation process;
validating in said first module said second view of said content generating process; and
in response to successfully validating said second view of said content generating process, signing said requested content using said first module and returning said signed content to said second module.

25. The method of claim 24, wherein said obtaining from a memory a first view of a running content generation process comprises obtaining from said memory static portions of said content generation process at a first time, and wherein said obtaining from said memory a second view of said running content generation process comprises obtaining from said memory static portions of said content generation process at a second time.

26. The method of claim 25, further comprising interconnecting said second module to a communication network, wherein said interconnecting is performed after said first time.

27. The method of claim 25, wherein said validating in said first module said second view of said content generating process includes:
applying a key to said static portions of said first view of said content generation process to obtain a first hash value;
applying said key to said static portions of said second view of said content generation process to obtain a second hash value; and
comparing said first has value to said second hash value, wherein said second view of said content generating process is successfully validated if said first hash value is equal to said second hash value.

28. The method of claim 27, wherein said key is said first private key.

29. The method of claim 24, wherein said obtaining from memory a first view of a running content generation process comprises obtaining from said memory dynamic portions of said content generation process at a first time, and wherein said obtaining from said memory a second view of said running content generation process comprises obtaining from said memory dynamic portions of said content generation process at a second time.

30. The method of claim 29, wherein said validating in said first module said second view of said content generation process includes:
determining whether said dynamic portions of said content generation process obtained at said second time fall within a valid range.

31. The method of claim 24, wherein said first private key is provided to said first module while said first module and said second module are disconnected from any public communication network.

32. The method of claim 24, wherein said requested content is passed to said first module without a key and without a passphrase.

33. The method of claim 24, wherein said first module comprises an encryption module, and wherein said second module comprises a content generation module.

34. The method of claim 24, wherein said content comprises a software enabling key.

35. The method of claim 24, wherein said signed content enables access to an application program or to data.

36. The method of claim 24, wherein said signed content is encrypted.

37. A system for generating signed content, comprising:
memory;
a content generation process running in said memory;
a signing or encryption process in communication with said content generation process; and
at least a first private key available to said signing or encryption process wherein said signing or encryption process obtains from said memory a first view of at least portions of said content generation process at a first time and a second view of at least portions of said content generation process at a second time, wherein said second time is contemporaneous with generation of first content by said content generation process, and wherein said signing or encryption process at least one of signs and encrypts said first content if said first and second views are equivalent to one another.

38. The system of claim 37, wherein said at least portions of said content generation process comprise static portions of said process.

39. The system of claim 37, wherein said at least portions of said content generation process comprise dynamic portions of said process, and wherein said dynamic portions included in said second view must be within a defined range if said first and second views are to be equivalent.

40. The system of claim 37, further comprising:
a first communication channel, wherein said content generation process and said signing or encryption process are in communication with one another over said first communication channel.

41. The system of claim 37, further comprising:
an interface module; and
a second communication channel, wherein said interference module and said content generation process are in communication with one another over said second communication channel.

42. The system of claim 41, further comprising:
a requesting device; and
a third communication channel, wherein said requesting device and said interference module are in communication with one another over said third communication channel.

43. The system of claim 42, wherein said first private key is provided to said encryption process prior to establishment of said third communication channel.

44. The system of claim 41, wherein said interface module comprises a web server.

45. The system of claim 37, wherein said requested content comprises a license.

46. A content generation system, comprising:
means for generating content;
means for at least one of signing and encrypting generated content; and
means for comparing a first view of a process implementing functions of said means for generating content to a second view of said process implementing functions of said means for generating content, wherein said first view is taken prior to said second view, wherein said second view is taken contemporaneously with a generation of first content by said means for generating content, and wherein said means for at least one of signing and encrypting generated content signs said first content after receiving verification from said means for comparing that said first view is equivalent to said second view.

47. The system of claim 46, further comprising:
means for providing a private key, wherein said private key is delivered to said means for at least one of signing and encrypting prior to said means for at least one of signing and encrypting receiving said generated first content.

48. The system of claim 46, further comprising:
means for creating a first hash value from said first view of a process for implementing functions of said means for generating content and a second hash value from said second view of said process for implementing functions of said means for generating content, wherein said means for comparing compares said first hash value to said second hash value.

49. The system of claim 46, further comprising:
means for notifying an authority of a determination by said means for comparing that said first view is not equivalent to said second view.

* * * * *